Patented Dec. 29, 1953

2,664,415

UNITED STATES PATENT OFFICE 2,664,415

POLYMERIZATION OF BUTADIENE-1,3 COMPOUNDS

James S. Sweely, Swarthmore, Pa., assignor to Sun Oil Company, Philadelphia, Pa., a corporation of New Jersey No Drawing. Application November 4, 1950, Serial No. 194,193

8 Claims. (Cl. 260—83.7)

This invention relates to emulsion polymerization of butadiene-1,3 compounds and more particularly to emulsifying agents for use in emulsion polymerizations at temperatures below about 32° F.

It is well known that butadiene-1,3 compounds and mixtures thereof with other monomers can be polymerized in aqueous emulsion to produce synthetic rubber latices which can be coagulated to yield synthetic rubber. Synthetic rubber-like materials have been prepared by polymerizing, in aqueous emulsion, butadiene-1,3, halogen derivatives thereof, or other substituted butadiene-1,3, compounds, or by interpolymerizing the above with other compounds containing a vinyl group such as styrene, acrylic acid esters, acrylic acid nitrile, vinyl chloride, etc.

Emulsion polymerizations can be conducted at temperatures at and above 32° F. or at temperatures below 32° F. Polymerization below 32° F. provides certain advantages over polymerization above 32° F. and these advantages are recognized in the art. However, emulsifying agents are necessary in polymerization below 32° F. as well as in polymerization above 32° F., and it is difficult to find suitable emulsifying agents for polymerization below 32° F. Many emulsifiers suitable above 32° F. are not suitable below 32° F.

I have discovered that potassium soaps of petroleum naphthenic acids are superior emulsifiers in emulsion polymerization below about 32° F. This discovery is, I believe, surprising in view of the fact that sodium naphthenates, which give, at polymerization temperatures above 32° F., essentially the same results as those obtained with potassium naphthenates, are not operative at all in polymerization below 32° F. at conditions normally used in such low temperature polymerization.

According to the present invention, polymerization recipes are prepared comprising water, a butadiene-1,3 compound, and possibly other monomers for interpolymerization therewith, and as emulsifier potassium soaps of petroleum naphthenic acids. Other ingredients are generally used, in accordance with prior art practice, to assist the polymerization, e. g. catalyst, catalyst activator, etc. Furthermore, in polymerizations below 32° F. a suitable antifreeze compound, e. g. glycerol, glycol, methanol or dioxane etc. is also used in the polymerization recipe. It has been found that methanol is far superior to other aliphatic monohydric alcohols for use in the process of the invention.

The emulsifying agent used according to the present invention can be conveniently prepared by saponifying petroleum naphthenic acids by reaction with caustic potash, or by other suitable means.

Petroleum naphthenic acids are mixtures of cycloaliphatic monocarboxylic acids which can be obtained in relatively concentrated form from crude petroleum by steps including saponifying a fraction of the petroleum to obtain a mixture comprising a major proportion of unsaponifiable material, e. g. oil, and a minor proportion of naphthenate soaps, effecting an at least partial separation between soaps and unsaponifiable material, and then acidifying the separated soaps to obtain naphthenic acids in relatively concentrated form.

Naphthenic acids for use according to the present invention are preferably those which have unsaponifiable material content less than about ten weight per cent because faster rates of polymerization are obtained with potassium soaps of such acids. Any suitable known method can be used to obtain naphthenic acids containing less than ten weight percent unsaponifiable material.

Still faster rates of polymerization can be obtained with potassium soaps of acids having certain preferred properties in addition to the preferred unsaponifiable material content specified above. These preferred properties are as follows:

The naphthenic acids used are preferably free from components boiling above about 510° F. at 1 mm. Hg pressure. Removal of constituents boiling above the desired maximum boiling point from naphthenic acids containing such constituents can be effected by any suitable means, e. g. vacuum distillation, for separation of acids according to molecular weight.

Furthermore, the naphthenic acids preferably have bromine number, as determined according to the method specified in A. S. T. M. Test 875-46T, less than about 6, and preferably about 0.3-2.0. Reduction of bromine number to the desired degree can be effected for example by contacting the acids with formaldehyde, or with a material capable of liberating formaldehyde, at an elevated temperature, e. g. 200-300° F. In such treatment, if solid materials are formed, they can be removed by suitable means, e. g. filtration. A catalyst such as mineral acid is used in the contacting step. It has been found that treatment as described above substantially reduces the bromine number of naphthenic acids originally having bromine number of for example at least 2. Any other suitable method can be used to reduce the bromine number.

Naphthenic acids used according to the present invention also preferably have saponification value, expressed as saponification value of oil-free naphthenic acids, within the approximate range 160-300, indicating average molecular weights for the acids of about 190-350.

The following example illustrates the invention:

Two interpolymerizations of butadiene-1,3 and styrene were carried out in aqueous emulsion. In each interpolymerization, the polymerization recipe consisted of 7.15 parts by weight butadiene, 28.5 parts by weight styrene, 0.15 part of a modifier comprising alkyl mercaptan analyzing 15.6 percent sulfur, this modifier being known commercially as Sulfole B-8, 0.2 part of potassium chloride as anti-coagulant, 0.21 part of cumene hydroperoxide as catalyst, 0.89 part of a catalyst activator complex (0.31 part of ferrous sulfate heptahydrate, 0.5 part of sodium pyrophosphate decahydrate, and 0.08 part of sodium hypophosphite), 180 parts water, 40 parts methanol as antifreeze, and 5 parts (dry basis) of alkali metal soaps of petroleum naphthenic acids.

The above naphthenic acids consisted of an initial −53.8 percent overhead fraction vacuum distilled from a formaldehyde-treated blend of 92.5 parts by weight of lubricating oil naphthenic acids with 7.5 parts of gas oil naphthenic acids. The lubricating oil acids had previously been prepared from crude petroleum by steps including distilling the crude to obtain light distillate fractions, saponifying the distillation residue, vacuum distilling the saponified residue to obtain lubricating oil distillate fractions, admixing the vacuum distillation residue with 25 percent aqueous isopropanol and with petroleum naphtha to obtain an extract comprising mainly petroleum naphtha and unsaponifiable material and a raffinate comprising mainly aqueous isopropanol and soaps of lubricating oil naphthenic acids, separating and acidifying the raffinate, separating lubricating oil naphthenic acids from the aqueous layer of the acidified raffinate, and steam distilling the separated naphthenic acids to remove small amounts of naphtha and obtain purified lubricating oil naphthenic acids. These acids were blended as described above with gas oil naphthenic acids which had been previously prepared from crude petroleum by steps including distilling the crude to obtain a gas oil distillate fraction, caustic treating the distillate, contacting the aqueous layer thus obtained with petroleum naphtha to extract unsaponifiable material therefrom, separating the raffinate thus obtained from the extract thus obtained, acidifying the raffinate, and separating the gas oil naphthenic acids thus obtained from the aqueous layer.

The formaldehyde-treating referred to above was conducted by contacting 89 parts by volume of the naphthenic acids blend with ten parts of 30% aqueous formaldehyde and one part of 1.84° Bé. sulfuric acid at 250–300° F., dissolving the contacted naphthenic acids in petroleum naphtha, filtering solid materials from the solution, washing the filtered solution, and distilling naphtha from the washed solution.

The initial −53.8 percent formaldehyde-treated distillate obtained as described above had saponification value about 179, bromine number about 1.4, unsaponifiable material content about 3 percent, and boiling range about 305–485° F. at 2 mm. Hg.

In one of the interpolymerizations referred to above, sodium soaps of the above described initial −53.8 percent distillate were used, which soaps were obtained by neutralizing the distillate with caustic soda. In the other interpolymerization, potassium soaps of the same distillate were used, which potassium soaps were obtained by neutralization with caustic potash.

Each interpolymerization was carried out at a closely controlled temperature of 14° F. At the end of about five hours, aliquot samples were taken from each reaction mixture, and the weight percent of solid polymerization product in each sample was determined. The following table shows the percent conversion obtained in about five hours using respectively the sodium soaps and the potassium soaps prepared as described above.

| | Per cent |
|---|---|
| Sodium naphthenates | 0.3 |
| Potassium naphthenates | 20.8 |

The polymerization in the presence of potassium naphthenates was continued until 60% polymerization was obtained. About 18 hours were required to reach this degree of polymerization; this indicates a faster rate of polymerization than can be obtained under similar conditions with some standard known emulsifiers.

This example shows that potassium naphthenates are superior emulsifying agents for butadiene-styrene interpolymerizations at 14° F., whereas sodium naphthenates are inoperative for such interpolymerizations under the conditions used.

Although, in the above examples, butadiene and styrene copolymers are used as examples of polymers of butadiene-1,3 compounds prepared by emulsion polymerization, at temperatures below about 32° F., in the presence of potassium naphthenates, the present invention can also be used in processes wherein copolymers of butadiene and acrylic acid nitrile, or of butadiene and methyl methacrylate, or of isoprene and styrene, or polymers of butadiene, chloroprene or isoprene are prepared by emulsion polymerization, or when other polymerizations of butadiene-1,3 compounds are conducted, at temperatures below about 32° F. Furthermore, although cumene hydroperoxide is used in the above examples as an example of a polymerization catalyst, other catalysts suitable for polymerization below 32° F. can be used, e. g. tertiary butyl isopropyl benzene hydroperoxide, 1-(2,4-dimethylbenzenediazomercapto) naphthalene, etc. Emulsifying agents according to the invention may be used in conjunction with any suitable known polymerization initiator, or other polymerization aid.

According to the present invention, polymerization of butadiene-1,3 compounds is conducted at temperatures below about 32° F. in aqueous emulsion in the presence of a polymerization-supporting proportion of potassium soaps of petroleum naphthenic acids. That is, the polymerization recipe contains enough such soaps, relative to the amounts of water, polymerizable monomers, unsaponifiable material, and polymerization inhibitors, so that polymerization proceeds at a suitable rate.

The concentration of potassium naphthenate emulsifying agent in the polymerization recipe varies according to the polymerization speed desired. Since potassium naphthenates used according to the invention generally result in faster polymerizations than previously used emulsifying agents, relatively small concentrations of potassium naphthenates generally give as good results as relatively large concentrations of other emulsifying agents. When using 180 parts by weight of water, 2.5–3.5 parts of potassium soaps of naphthenic acids can advantageously be used when the naphthenic acids have unsaponifiable material content less than about ten percent, saponification value within the approximate range 160–300, and bromine number within the approximate range 0.3–2.0, and are substantially free from components boiling above about 510° F. at 1 mm. Hg. More than 3.5 parts of potassium naphthenates can be used when still faster polymerizations are desired, or when the naphthenic acids do not have the preferred properties above. It is generally preferred that 1–8 parts of potassium naphthenates be used per 180 parts of water.

Emulsion polymerization of butadiene-1,3 compounds at temperatures of at least about 32° F. in the presence of alkali metal soaps of petroleum naphthenic acids containing less than about 10 percent unsaponifiable material, having bromine number less than about 6 and saponification value on an oil-free basis of about 160–300, the naphthenic acids being substantially free from components boiling above about 485° F. at 1 mm. Hg is disclosed and claimed in my copending application, Serial No. 194,194 filed November 4, 1950.

I claim:

1. The process which comprises polymerizing, at a temperature below about 32° F., a butadiene-1,3 compound in aqueous emulsion in the presence of potassium soaps of petroleum naphthenic acids.

2. Process according to claim 1 wherein said naphthenic acids substantially all boil below about 510° F. at 1 mm. Hg.

3. Process according to claim 1 wherein said naphthenic acids have bromine number less than about 6.

4. Process according to claim 1 wherein said naphthenic acids have saponification value on oil-free basis about 160–300.

5. Process according to claim 1 wherein said naphthenic acids contain less than about 10 weight percent unsaponifiable material.

6. Process according to claim 1 wherein butadiene-1,3 is interpolymerized with styrene.

7. Process according to claim 1 wherein said polymerizing is conducted in the presence of one to eight parts by weight of said soaps per 100 parts of water.

8. The process which comprises interpolymerizing, at a temperature below about 32° F., butadiene-1,3 and styrene in aqueous emulsion in the presence of one to eight parts by weight, per 100 parts of water, of potassium soaps of petroleum naphthenic acids having bromine number less than about 6 and saponification value on oil-free basis about 160–300, said acids containing less than about 10 weight percent unsaponifiable material, said acids substantially all boiling below about 510° F. at 1 mm. Hg.

JAMES S. SWEELY.

References Cited in the file of this patent

UNITED STATES PATENTS

| Number | Name | Date |
|---|---|---|
| 2,420,244 | Henderson et al. | May 6, 1947 |

OTHER REFERENCES

Starkweather et al., Ind. & Eng. Chem., vol. 39, No. 2, February 1947, page 211.

Shearon, Jr., et al., Ind. & Eng. Chem., vol. 40, No. 5, May 1948, pp. 769–777.

Troyan, Rubber Age, vol. 63, No. 5, August 1948, pages 585–595.